United States Patent [19]

Begin

[11] Patent Number: 5,729,131
[45] Date of Patent: Mar. 17, 1998

[54] POSITION MEASUREMENT APPARATUS AND METHOD OF USING SAME WITH SONIC PULSE PROPAGATION DELAY INTERVAL

[75] Inventor: John D. Begin, Sterling Heights, Mich.

[73] Assignee: Patriot Sensors & Controls Corporation, Clawson, Mich.

[21] Appl. No.: 615,487

[22] Filed: Mar. 12, 1996

[51] Int. Cl.$^6$ .................................................. G01R 33/18
[52] U.S. Cl. .................................................. 324/207.13
[58] Field of Search ........................ 324/207.12, 207.13, 324/207.24, 207.22; 73/313, 314; 333/148

[56] References Cited

U.S. PATENT DOCUMENTS

| | | | |
|---|---|---|---|
| 4,071,818 | 1/1978 | Krisst | 324/207.13 |
| 4,654,590 | 3/1987 | Kitaura et al. | 324/207.13 |
| 4,839,590 | 6/1989 | Koski et al. | |
| 4,943,773 | 7/1990 | Koski et al. | |
| 5,017,867 | 5/1991 | Dumais et al. | |
| 5,050,430 | 9/1991 | Begin et al. | |
| 5,196,791 | 3/1993 | Dumais | |
| 5,198,761 | 3/1993 | Hashimoto et al. | 324/207.12 |
| 5,212,444 | 5/1993 | Abramovich et al. | |
| 5,258,707 | 11/1993 | Begin et al. | |
| 5,274,328 | 12/1993 | Begin et al. | |
| 5,406,200 | 4/1995 | Begin et al. | |
| 5,412,316 | 5/1995 | Dumais et al. | |

*Primary Examiner*—Sandra L. O'Shea
*Assistant Examiner*—Roger Phillips
*Attorney, Agent, or Firm*—Young & Basile, P.C.

[57] ABSTRACT

A magnetostrictive wire waveguide type position measuring system wherein the wire waveguide is mounted within a small diameter brass tube which, in turn, is mounted by way of resilient suspension components within a rigid outer tube affixed to a position reference frame. The suspension system prevents relatively high frequency shock inputs characteristic of rough environment applications from reaching the waveguide. The position signal is derived from output signal quantities generated by the propagation times of sonic disturbances from a first reference magnet held in a fixed position relative to the outer housing and a second user magnet which moves relative to the outer housing with the element or quantity being monitored. To compensate for longitudinal movement of the waveguide within the floating suspension system and to afford a time interval for further signal compensation purposes, a computer calculates a variable time delay related to the difference between a constant and the propagation time of the reference magnet impulse and adds this variable delay to the user magnet propagation time. Position is determined as a function of the time interval between and original excitation signal and the propagation variably delayed user magnet impulse.

19 Claims, 3 Drawing Sheets

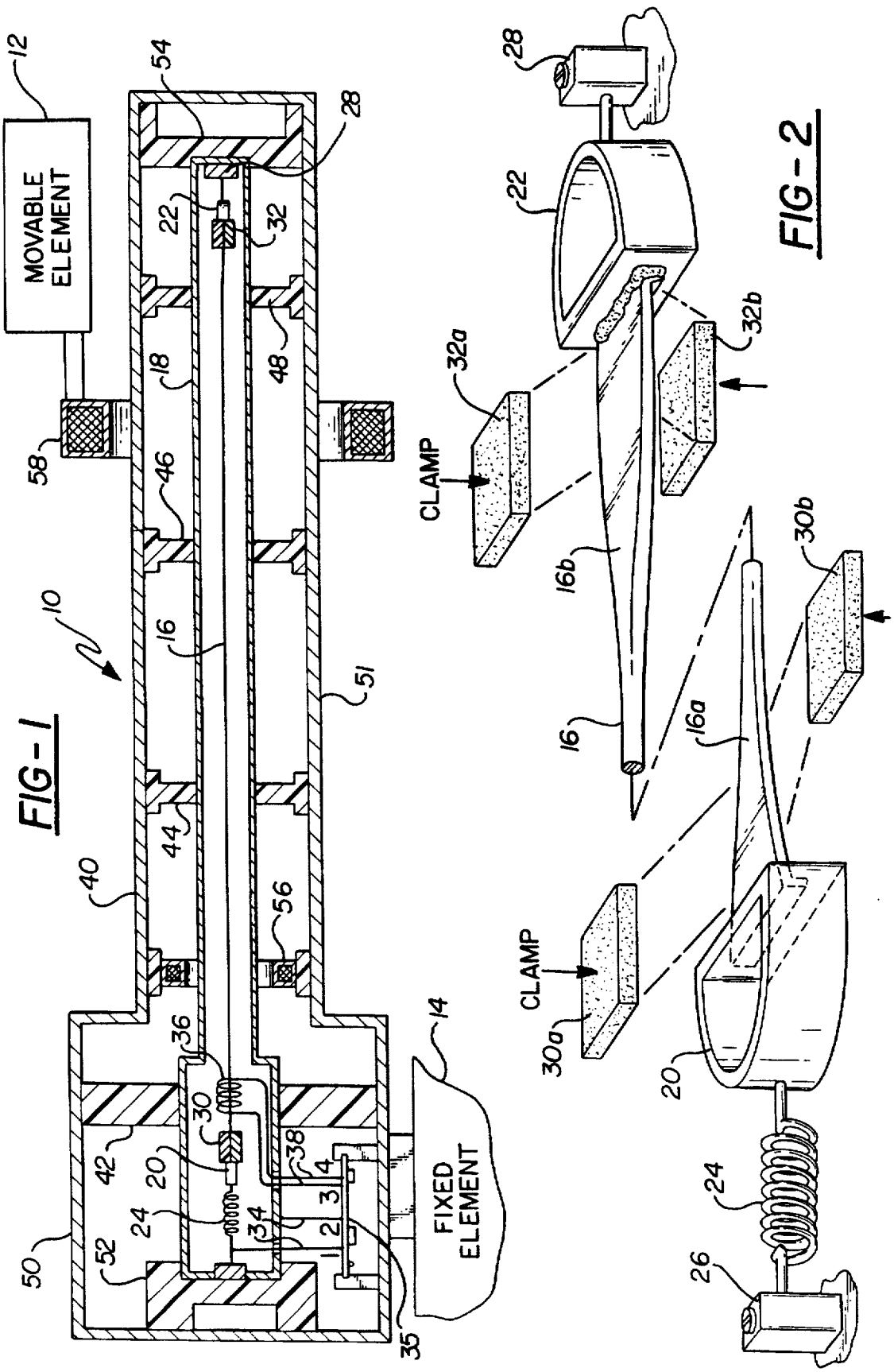

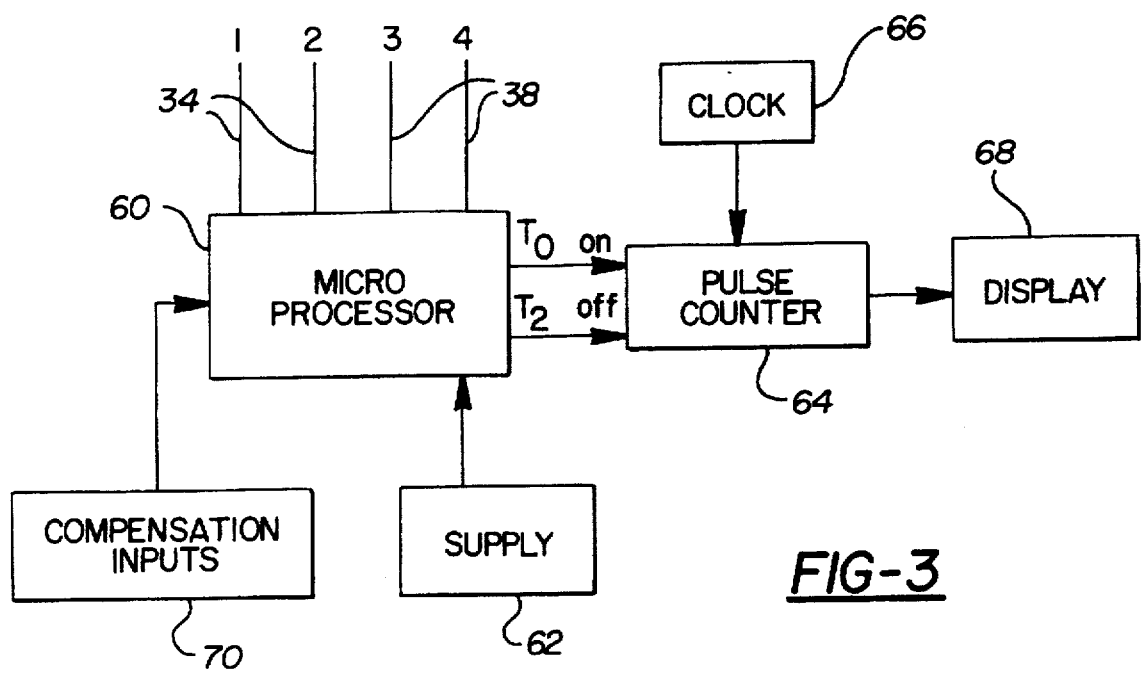
FIG-3
FIG-4
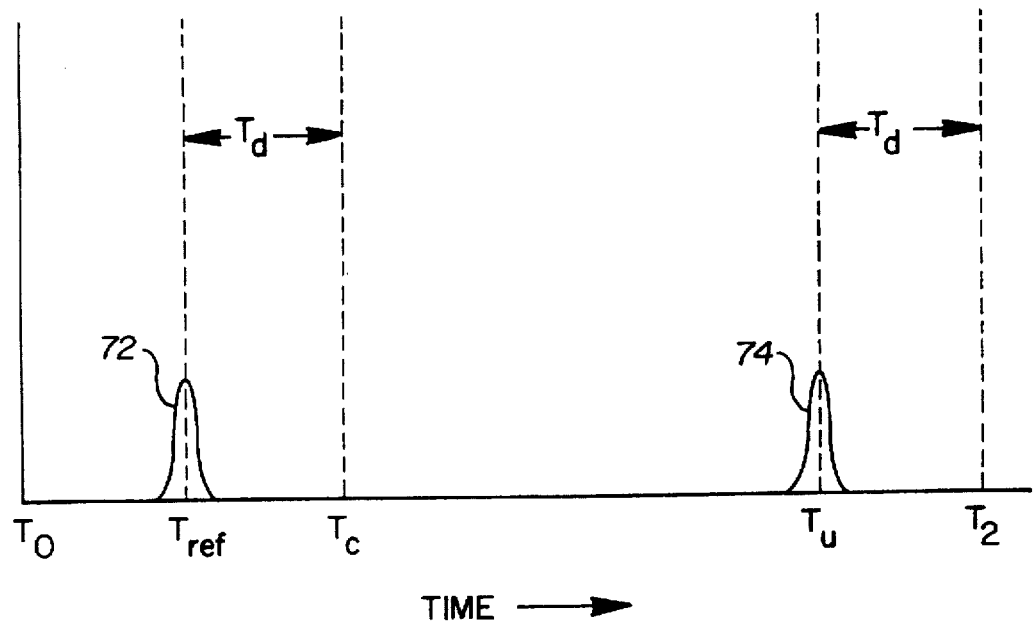

POSITION MEASUREMENT APPARATUS AND METHOD OF USING SAME WITH SONIC PULSE PROPAGATION DELAY INTERVAL

RELATED APPLICATION

This application is related to copending applications "Position Measurement Apparatus Using Wire Waveguide in Shock Resistant Suspension and Method of Using Same" Ser. No. 08/615,489, filed Mar. 12, 1996, and "Magnetostrictive Position Measurement Apparatus with Anti-Reflection Waveguide Terminals" Ser. No. 08/615,488, filed Mar. 12, 1996 both filed simultaneously herewith by John D. Begin and assigned to Patriot Sensors and Controls, Inc.

FIELD OF THE INVENTION

This invention relates to position measurement apparatus of the type utilizing a magnetostrictive wire waveguide which extends through a measurement field and in which the position of a movable element within the field is determined as a function of the propagation times of sonic disturbances along the waveguide. The invention features a shock resistant suspension system for the waveguide which reduces the effects of external shock inputs on the accuracy of the measurement function and a signal processing system and method which adds a calculated delay time interval to the measured position signal quantity, so that compensation calculations can be performed during the delay time interval.

BACKGROUND OF THE INVENTION

The use of a magnetostrictive wire waveguide to measure the position of a moveable element such as a machine tool component or a float is described in the prior art including, by way of example, U.S. Pat. No. 4,839,590 issued Jun. 13, 1989 to Richard Koski, William Kosco, and Arthur Dumais and assigned by mesne assignments to Patriot Sensors, Inc. of Clawson, Mich. In general, the magnetostrictive wire waveguide extends through the measurement field and cooperates with a toroidal "user" magnet which is moveable along and in surrounding relationship to the waveguide, the position of the user magnet being related to the position of a quantity or component being monitored. Although the specific manner of using a magnetostrictive waveguide as a position transducer may vary, the measurement function in all cases involves a determination of the time required for a sonic disturbance to propagate along the waveguide from a fixed position at or near one end of the waveguide and the user magnet or vice versa. Since the propagation speed is known, distance can be determined as a function of time.

In such devices, the accuracy of the position measurement can be seriously degraded by high frequency shocks which are transmitted to the waveguide from the outside world through the waveguide housing and support components. Such shocks and reflections thereof can be erroneously interpreted by the pickup as sonic disturbances. By way of example, a wire waveguide position measuring apparatus of the type described might be used to measure the position of the blade of an earthmoving machine relative to a reference or home position. In such an environment, the apparatus could be subject to frequent mechanical shock disturbances. The shock disturbances can, in conventional prior art devices, travel into the wire waveguide through the anchoring components and housings and can be erroneously identified by the position measurement circuitry as position-related inputs when in fact they are mechanical "noise."

Magnetostrictive wire waveguide position measurement devices generally employ a iron alloy wire of nominally circular cross-section the ends of which are anchored so that the wire waveguide extends through the measurement field. The measurement field may be of any given or desired length and typical examples in industrial applications run anywhere from a few inches to more than two hundred feet. These are merely examples and are not intended as limitations.

It is known to be desirable to compensate for the effects of temperature on propagation rate, wire length and electrical values which can reduce the accuracy of the measurement process; see, for example, U.S. Pat. No. 5,050,430 issued Sep. 24, 1991 to John Begin and Richard Koski, U.S. Pat. No. 5,274,328 issued Dec. 28, 1993 to John Begin and Richard Koski, and U.S. Pat. No. 5,406,200 issued Apr. 11, 1995 to John Begin and Richard Koski. All of these patents are owned by mesne assignments by Patriot Sensors, Inc. of Clawson, Mich. The problem which arises in all compensation techniques for magnetostrictive wire waveguide measurement devices is one of time; i.e., compensation requires not only accurate measurement of the environmental quantities which affect accuracy, but also sufficient time for the compensation calculations to be performed. Time is at a premium in measurement devices of the type described herein as a result of the speeds at which the signal quantities travel through the waveguide.

SUMMARY OF THE INVENTION

In accordance with the invention, a delay time interval within which compensation corrections for temperature and other variable conditions can be carried out in the operation of a magnetostrictive position measurement device is created by adding a delay time interval to the arrival time of the second of two impulses which are used for position measurement purposes.

The delay can be fixed or variable; in the preferred embodiment of the invention more fully described hereinafter, the delay time interval is variable, the variations in the delay interval being determined by the effects of mounting the waveguide in a shock-filtering resilient suspension system which permits movement of the waveguide relative to the reference frame.

In the illustrative embodiment hereinafter described in greater detail, the waveguide is associated with two magnets: a reference magnet having a fixed position association with the reference frame and coupled to the waveguide to produce sonic impulses in the waveguide when the waveguide is excited; and a second "user" magnet which is movable relative to the reference frame and coupled to the waveguide so as to produce a second sonic impulse, the timing of which relative to the first impulse is a function of (a) position of the movable element being monitored and (b) any shifts in the waveguide position relative to the reference frame which occurs as a result of inertial inputs.

The delay time interval is calculated by subtracting the arrival time of the reference impulse at the pickup coil from a constant. This assures that there is always a delay time interval whether or not the waveguide is shifted as a result of inertial (shock) inputs and further assures, as hereinafter explained, that the delay interval varies inversely to the variations in distance between the reference magnet and the pickup coil caused by shifts in the waveguide's absolute position.

These and other features and advantages of the present invention will be apparent from a reading of the following specification which describes an illustrative embodiment in detail.

BRIEF DESCRIPTION OF THE DRAWINGS

FIG. 1 is a cross-sectional view of a wire waveguide position measurement apparatus illustrating a waveguide shock resistant suspension system for the waveguide;

FIG. 2 is an exploded perspective view of the wire waveguide emphasizing the reflection resistant termination configuration details;

FIG. 3 is a schematic block diagram of the signal processing system utilized with the apparatus of FIG. 1;

FIG. 4 is a timing diagram for use in explaining the operation of the system of FIG. 3.

DETAILED DESCRIPTION OF THE ILLUSTRATIVE EMBODIMENT

Figure 6:
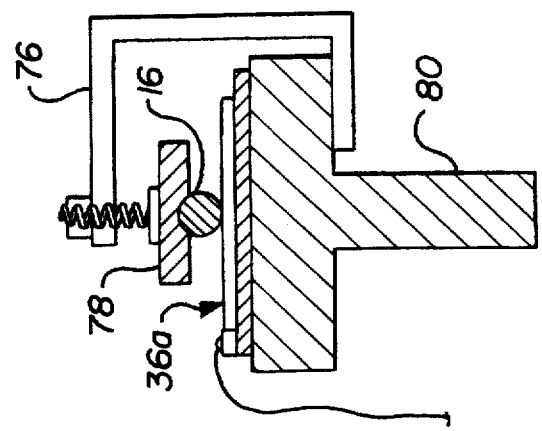
FIGS. 5 and 6 are cross-sectional views of the apparatus of FIG. 1 with an alternative signal pickup.

Referring to FIG. 1, there is shown a magnetostrictive wire waveguide type position measurement apparatus 10 for determining the position of a moveable element 12 relative to a fixed or reference element 14. It will be appreciated that the moveable and fixed elements 12 and 14 are representative of wide variety of elements, components or quantities associated with various specific applications; by way of example, the moveable element 12 may be a metal removal tool or cutter adapted to move into and out of a workpiece held fixed relative to a machine frame represented in FIG. 1 by reference numeral 14. As another example, the moveable element 12 may represent a blade or shovel which is controllable in position relative to the frame of an off-road vehicle, said frame being represented by the fixed element 14.

Measurement apparatus 10 comprises a magnetostrictive wire waveguide 16 in the form of a 0.025" diameter iron alloy wire extending linearly and under tension through a measurement field of appropriately chosen length the field length may vary from to few inches to hundreds of feet. Wire waveguide 16 is mounted concentrically within a 0.125" outer diameter brass tube 18 by way of shackles 20 and 22. Shackle 20 is used as a transition between the wire waveguide 16 and a compression spring 24 which in turn is secured to an anchor 26, the spring serving to apply appropriate tension to the waveguide essentially to maintain its physical straightness through the interior of the brass tube 18; i.e., the tension applied to the tube is essentially unrelated to the propagation speed of sonic impulses therethrough as hereinafter discussed. Shackle 22 also serves as a coupling between the wire waveguide 16 and a connecting element which is secured to the brass tube 18 by anchor 28. The wire waveguide 16, the shackles 20 and 22, the spring 24 and the brass tube 18 are all conductive so that an electrical circuit is established between terminals numbered 1 and 2 on the ends of signal input wires 34 which are connected to electronics circuit board 35 hereinafter described with reference to FIG. 3. Reflection damping pads 30 and 32 of silicon rubber or other appropriate resilient material are clamped about the terminal ends of the wire waveguide 16 for reflection damping purposes as is better described below with reference to FIG. 2. A pick-up coil 36 surrounds the wire waveguide 16 near the left terminal end as shown in FIG. 1 and is connected by conductive wires 38 for connection to circuit board 35.

The arrangement and dimensions given above are examples only. The waveguide, for example, need not be linear but may be curved to accommodate a given measurement field. Multiple user magnets may also be used.

The brass tube 18 containing waveguide 16 which it extends linearly and concentrically is resiliently mounted within a steel outer housing 40 having a head 50 and a body 51 of generally tubular configuration by means of washer or disk shaped suspension components 42, 44, 46, and 48 of silicon rubber or other resilient material. Rubber acoustic dampening end structures 52 and 54 are provided between the ends of the brass tube 18 and the ends walls of the steel housing 40 to provide resilient suspension in the axial or longitudinal direction. The material and physical properties; i.e., the shape, density and resilience of the acoustic dampening suspension system components 42, 44, 46, 48, 52, and 54 can be chosen to filter out or dampen shock inputs in almost any selected frequency range which is expected in the environment of use. As a general proposition, the material of the suspension system components is chosen to filter out relatively high frequency shock inputs; e.g., those having a characteristic frequency above 200 hertz.

The configurations of the suspension system components in FIG. 1 are intended as examples for illustration only and it will be appreciated by those skilled in the applicable arts that other configurations can be chosen in accordance with the configuration of the anchoring and housing structures associated with a particular waveguide apparatus. In general, it is the objective of the suspension system to isolate the wire waveguide 16 from externally created or applied shock inputs along all three axis; i.e., the longitudinal axis and the radial axis. The effect of "floating" the wire waveguide 16 and its support tube 18 within the fixed external housing 40, however, requires special considerations insofar as position measurement accuracy is concerned as hereinafter described.

As mentioned above, the waveguide 16 serves as a transducer which extends under tension through the measurement field. For this purpose, a first toroidal magnet 56 is mounted within and to the internal cylindrical surface of the steel housing 10 at a point spaced longitudinally from but near the left end of the wire waveguide 16 as shown in FIG. 1; i.e., near the end at which the pick-up coil 36 is located. Magnet 56 is preferably an electromagnet which is excited only when a measurement is underway. However, it may also be a permanent magnet and need not be within the housing 40. In all cases, however, magnet 56 is a position "reference" magnet and is fixed relative to the measurement field.

A second toroidal permanent magnet 58, herein referred to as a "user magnet," is disposed around the body 51 of the steel housing 40 in spaced relationship thereto and is moveable longitudinally or axially along the tube 40 and the wire waveguide 16 by virtue of being mechanically attached to the moveable element 12 the position of which is to be monitored. This mechanical connection can take a variety of forms as described briefly above. The advantages of the shock filtering suspension system are, of course, greatest in environments which involve a likelihood of shock or vibration.

Figure 5:
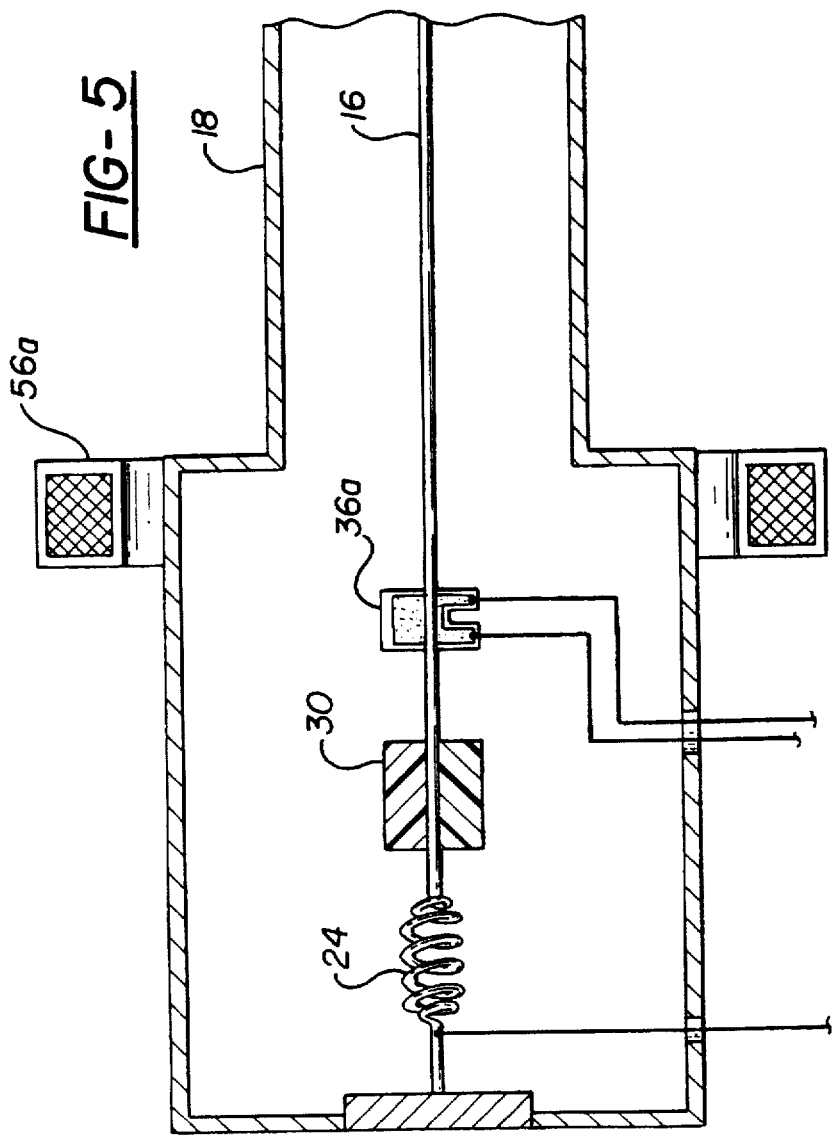

FIGS. 5 and 6 illustrate a portion of the apparatus of FIG. 1 using an alternative form of signal pickup 36a and a relocated reference magnet 56a. Pickup 36a comprises a thin film of piezoelectric material on a pliable carrier. The pickup is clamped against waveguide 16 such that the sonic disturbances, essentially a torsional twist which propagates along the waveguide, locally stretches and strains the piezoelectric material sufficiently to produce an output in the 10–100 mv range. Suitable film-type piezoelectric transducers are available from AMP Incorporated of Valley Force, Pa. under the product designation LDTL-028K.

The piezoelectric pickup 36a permits the reference magnet 56a to be moved to a location very close to the pickup 36a; i.e., a location which would place the conventional coil pickup 36 of FIG. 1 in the magnetic filed and create a risk of signal degradation. The film pickup 36a, therefore, allows for a more compact product design.

FIG. 6 shows the pickup 36a mounted on a rigid base 80 which is integrated with housing 18. A compliant pad 78 and a clamp 76 holds the waveguide 16 against the surface of the piezoelectric pickup.

In general, the operation of the device shown in FIG. 1 entails the application of a current pulse to the wire waveguide 16 by way of input wires 34. This current pulse reacts to the magnetic fields created by the reference and user magnets 56 and 58, respectively, to create essentially simultaneous sonic disturbances or impulses in the wire waveguide which propagate linearly in both directions. The pick-up coil 36 receives the sonic disturbance from the reference magnet 56 first in time and calculates its propagation time for purposes hereinafter described. Coil 36 receives the sonic disturbance associated with user magnet 58 second in time, the interval between the arrival of the impulse from reference magnet 56 and the arrival of the pulse from user magnet 58 being a function of the axial position of magnet 58 along the outside surface of the tube 40. Because sonic propagation speed in waveguide 16 is known, the time between the arrivals of the pulses is an indication of the position of the moveable element 12 relative to the magnet 56 and the fixed element 14 on which the housing 40 is carried. Using apparatus and methods hereinafter described, the exact length of the time interval is determined and the position of the moveable element 12 is either recorded or displayed, the term "display" being used herein to represent any effective utilization of the position signal output.

Referring now to FIG. 2, the physical configuration of the wire waveguide 16 and particularly the left and right terminal ends thereof are shown in detail. The wire waveguide which, as mentioned above, can be effectively any desired length, is nominally of circular or round cross-section throughout the measurement field. However, to reduce the amplitude of the reflections of sonic disturbances propagating along the waveguide from the terminal ends thereof, the left and right terminal portions 16a and 16b which lie outside of the measurement field; e.g., end portions of approximately 1"–3" in length, are mechanically physically altered in section into a gradually flattened and widened shape. These terminal end portions are attached, such as by soldering, to the end surfaces of the conductive shackles 20 and 22 as shown in FIG. 2. Obviously, other attachment mechanicals can be employed. It has been found that a gradual rather than an abrupt change in waveguide wire configuration reduces the tendency of the waveguide material to reflect sonic disturbances propagating along the wire. The term "gradual" means that the cross-sectional shape change occurs over a length which is a substantial multiple of the nominal wire diameter. Moreover, the change from a circular or round configuration to a flat, widened, essentially rectangular configuration over a distance which is large relative to the diameter of the wire changes significantly the surface area to volume ratio of the wire material and provides a large surface area for physical contact with pads 30a, 30b and 32a, 32b at the left and right terminal ends of the wire 16, respectively. The pads 30 and 32 are clamped into a contacting configuration which sandwiches the flattened portions 16a and 16b of the wire waveguide 16 therebetween. The result is a substantial reduction in sonic reflection at the terminal ends and a simplification of the signal processing circuitry as hereinafter described. The shape transition of the terminal ends of the waveguide 16 has been found to provide reflection dampening ratios of up to 100:1 as compared with prior art anti-reflection techniques which provide ratios of only about 20:1. Moreover, the flattened sections 16a and 16b have been found to be far less sensitive to clamping pressure and, therefore, give rise to relaxed construction requirements and greater uniformity in product performance. Coil 36 is spaced far enough from left end of waveguide 16 to be around the uniform 0.025" diameter portion thereof.

Turning now to FIG. 3, the details of a signal processing system mounted on circuit board 35 for producing position signal outputs are shown. The signal processing circuitry comprises in principal part a conventional programmable digital microprocessor 60 which is connected through appropriate signal conditioning circuitry apparent to those skilled in the electronics arts to receive the input signal on wires 34 which is used to excite the wire waveguide 16 as previously described. Microprocessor 60 is connected to receive as inputs the pulses which are generated in pick-up coil 36 as the sonic disturbances from the magnets 56 and 58 propagate along the wire waveguide 16 from right to left as shown in FIG. 1. The signal processing described herein can be accomplished with electronics other than a digital computer; for example, hardwired, analog devices can be used. The terms "computer" and "microprocessor," as used herein, are not to be construed only to describe digital or even programmable devices.

As shown in FIG. 4 the occurrence of the excitation signal occurs at $T_0$ and begins the first of repetitive timing cycles. The excitation signal is applied to the ON input of a pulse counter 64 which receives and counts high frequency signals from clock 66. Position resolution is a function of the frequency of clock 66 and, therefore, it is usually chosen to run as fast as possible. At some point after the occurrence of the excitation signal at $T_0$ the first sonic disturbance from the reference magnet 56 arrives at the coil 36 and results in an output voltage pulse 72 at a time $T_{ref}$. But for the shock dampening suspension of the apparatus shown in FIG. 1 $T_{ref}$ would always occur in fixed time relationship to $T_0$; i.e., at a time related to the physical distance between the centerline of the reference magnet 56 and the location of the pick-up coil 36. The suspension system, however, permits the brass tube 18 and the concentrically mounted wire waveguide 16 therein to "float" relative to the outer housing 40 and this gives rise to small but significant changes in the distance between the centerline of magnet 56 and the pick-up coil 36 at any given time. For example, if the outer housing 40 is mounted such that the longitudinal axis thereof coincides with the longitudinal axis of an off-road vehicle to which the measurement apparatus 10 is affixed, accelerations and decelerations of the vehicle can cause the tube 18 to shift within the tube 40 and this shift must be taken into account if accurate position measurements are to be made. A shift of the tube 18 to the right as seen in FIG. 1 has the effect of shortening the propagation time of the impulse 72 from the reference magnet 56 to the pickup 36 or 36a. Although mounting both magnets 56 and 58 in the same reference eliminates error due to the suspension system, it is desirable, as hereinafter explained, to add an increment of time, herein called a "delay interval," to the propagation time of the impulse 74 from the user magnet. The greater the shift to the right, the greater the time increment which is added to the user magnet impulse propagation time. Conversely, a shift of tube 18 to the left increases the propagation time of the reference signal and requires a smaller delay interval to be added to the user magnet impulse propagation time.

Accordingly, the time difference between the propagation time of the reference impulse 72 to pickup 36 or 36a and a constant is determined. This quantity is used in microprocessor 60 to calculate a complemental interval, $T_d$, which is thereafter added to time $T_u$ at which a voltage impulse 74 representing the arrival of the sonic propagation from magnet 58 at the pickup 36 or 36a occurs; FIG. 4 shows that the calculated interval $T_2$ is added to $T_u$ to derive a delayed pulse at time $T_u$ which is applied to the OFF input of the pulse counter 64 to terminate counting pulses from the clock 66. The pulse count between $T_2$ and $T_O$ is used to produce an output which is applied to the display 68 to determine the position of the magnet 58 relative to the fixed reference.

Using arbitrary numbers for illustration, suppose the propagation time $T_{ref}$ of the reference impulse 72 is nominally 5 units when the suspension is unflexed. Suppose further that a shift of the position of tube 18 to the right occurs and the propagation time of impulse 72 to the coil 36 is shortened to four units. The complement of four relative to a constant ten is six and, therefore, six units are added by the microprocessor 60 to the user impulse propagation time $T_u$ to compensate for the shift. If a greater shift to the right shortens the propagation time to three units, a seven unit delay $T_d$ is calculated and added to $T_u$. Conversely, shifts to the left produce shorter delay intervals $T_d$. This is achieved by a simple look-up table which equates pulse counts to positions and is stored in the memory of microprocessor 60.

In brief, the user magnet signal propagation time is delayed by the complement of the calculated longitudinal waveguide shift, if any, due to the shock-dampening suspension system.

As shown in FIG. 3, the system with which the device of FIG. 1 is used also includes transducers such as thermometers and pressure transducers, collectively represented at 70, to produce additional compensation signal inputs in a format which are compatible with the logic signal levels utilized by microprocessor 60. Those inputs are used during the delay time interval $T_d$ between $T_u$ and $T_2$ to perform compensations as necessary to adjust the timing interval and the display of a calculated signal position which is derived therefrom.

It will be appreciated that the suspension system which damps out relatively high frequency shock type inputs and prevents those inputs from reaching the wire waveguide 16 eliminates noise in the form of shock inputs to the waveguide 16 that might be recognized by the coil 36 as sonic signal quantities which are deliberately created by interaction of a current pulse through the wire and the fields created by magnets 56 and 58. The elimination of this significant noise source not only permits the utilization of the magnetostrictive wire waveguide measurement system in applications where the use environment is conducive to shock inputs but also simplifies the filtering and signal processing circuitry required in association with the microprocessor 60. It will be appreciated that this suspension system is of value in connection with magnetostrictive wire waveguide signal processing techniques other than that specifically disclosed herein.

It will also be appreciated that the termination configurations for the waveguide wire which are shown in FIG. 2 of the drawing are effective in reducing reflections and, therefore, eliminating the ambiguities which can be created from the reflection of sonic disturbances in the wire from the opposite end terminals. Again, this improvement is of practical value independently of the shock dampening suspension system and/or any particular type of signal processing protocol.

I claim:

1. In a position measurement device including a magnetostrictive wire waveguide extending through a measurement field and a user magnet movable relative to and in operative association with the waveguide in accordance with the position of a quantity to be monitored thereby to produce sonic disturbances in the waveguide, the improvement which comprises:
    a pick up associated with the wire waveguide for generating electrical signal impulses upon arrival of sonic pulses traveling said waveguide at said pick up;
    means for calculating a delay interval based on a variable affecting the operation of said wave guide; and
    means for adding said delay interval to the propagation time of a sonic impulse from said user magnet to said pick up.

2. Apparatus as described in claim 1 further including a reference magnet associated with the waveguide to produce a reference sonic disturbance in the waveguide.

3. Apparatus as defined in claim 2 further including means for resiliently suspending the waveguide and pick up relative to the user and reference magnet.

4. Apparatus as defined in claim 3 wherein the means of calculating the delay interval include said reference magnet and said pick up such that the delay interval is a function of the shift in the waveguide position relative to the reference magnet as permitted by said resilient suspension means.

5. In a position measurement device including a magnetostrictive wire waveguide extending through a measurement field, means for imparting electrical impulses to the wire waveguide, a pickup, a reference magnet mounted in relatively fixed relationship to the waveguide for producing a reference sonic disturbance in the waveguide and a relatively moveable user magnet movable along the waveguide in accordance with the position of a position-variable quantity to be monitored thereby to produce second sonic disturbances in the waveguide, the improvement which comprises:
    means for resiliently suspending the waveguide and pickup to permit limited movement relative to the reference magnet;
    means for generating electrical signal impulses upon arrival of sonic impulses at said pickup;
    means for calculating a delay interval based on the propagation time of impulses from said reference magnet to said pickup; and
    means for adding said delay interval to the propagation time of a sonic impulse from said user magnet to said pickup.

6. A position measurement device as defined in claim 5 wherein said means for calculating includes means for subtracting the propagation time of at least one impulse from the reference magnet to the pickup from a constant, the delay interval being a function of the result of said substraction.

7. A position measurement device as defined in claim 6 further including means for generating signals representing variable environmental quantities; means for calculating position as a function of said propagation times; and means responsive to the environmental quantity signals for adjusting the position signal during the delay time interval.

8. In combination with a position measurement apparatus including a magnetostrictive waveguide extending through a measurement field, means for exciting the waveguide and pickup means for generating signal impulses upon receipt of sonic disturbances traveling said waveguide, the improvement which comprises:

resilient suspension means for suspending said waveguide and pickup means relative to a frame of reference;

a reference magnet mounted in fixed relation to the frame of reference and operative coupled to the waveguide;

a user magnet operatively coupled to the waveguide and movable relative to the waveguide in accordance with the movement of an element to be monitored;

means for determining the position of the user magnet relative to the reference frame from the propagation times of sonic impulses from the reference and user magnets to the pickup means;

means for calculating a delay time interval; and means for compensating the determined position to eliminate the effects of environmental factors during said delay time interval.

9. Apparatus as defined in claim 8 wherein the delay time interval is calculated by subtracting the propagation time of the reference magnet impulse from a constant.

10. Apparatus as defined in claim 8 further including a non-magnetic tubular support structure for the waveguide and the pickup.

11. Apparatus as defined in claim 8 further including an outer housing enclosing the inner housing and fixed relative to the reference frame.

12. Apparatus as defined in claim 11 wherein the reference magnet is mounted within the housing but outside of the non-magnetic tube.

13. Apparatus as defined in claim 12 wherein the user magnet is mounted for movement outside and along the outer housing.

14. Apparatus as defined in claim 13 wherein the inner and outer housings are cylindrical and concentric.

15. Apparatus as defined in claim 8 wherein the suspension means comprises a plurality of resilient shock-dampening suspension elements.

16. A method of operating a position measurement device including a magnetostrictive wire waveguide mounted so as to extend through a measurement field and a magnet moveable through at least a portion of said field in accordance with the position of an element or quantity to be monitored comprising the steps of:

a. generating an impulse representing the propagation time of a sonic disturbance from the moveable magnet to an end of the waveguide;

b. adding a delay interval to said propagation time; and c. performing compensation functions based on variable waveguide performance characteristics during said interval.

17. A method of operating a position measurement device including a magnetostrictive wire waveguide mounted to extend through a measurement field and a user magnet operatively coupled to the waveguide and moveable relative to the waveguide in accordance with the position of a quantity being measured comprising the steps of:

a. generating a signal quantity representing the propagation time of the sonic disturbance from the user magnet to an end of the waveguide;

b. calculating a delay time interval based on a measured variable affecting operation of said waveguide;

c. delaying the propagation time by the calculated delay time interval; and d. performing compensation functions for waveguide variables during said delay time interval.

18. A method of operating a position measurement device including a magnetostrictive wire waveguide linearly mounted in the measurement field by way of a suspension system which permits the waveguide to float relative to a mechanical reference support structure comprising the steps of:

a. generating a first impulse representing the time period between excitation of the wire waveguide and the propagation time of a reference sonic disturbance from a reference magnet mounted on the support structure to a pickup mounted in fixed relation to the waveguide;

b. calculating the movement of the waveguide relative to the mechanical support structure;

c. generating a second impulse representing the propagation time of a sonic disturbance from a movable user associated with a moveable member the position of which is to be determined;

d. delaying the second impulse by the calculated movement of the waveguide; and e. calculating user magnet position as a function of the delayed second impulse time.

19. A method as described in claim 18 including the further steps of performing compensation calculations during the delay period.

* * * * *